(12) United States Patent
Wei

(10) Patent No.: US 8,588,100 B2
(45) Date of Patent: Nov. 19, 2013

(54) METHOD AND APPARATUS FOR DATA RETRANSMISSION IN AN ENHANCED MULTIMEDIA BROADCAST AND MULTICAST SERVICE

(75) Inventor: Wei Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 144 days.

(21) Appl. No.: 13/259,306

(22) PCT Filed: Aug. 21, 2009

(86) PCT No.: PCT/CN2009/073405
§ 371 (c)(1),
(2), (4) Date: Sep. 23, 2011

(87) PCT Pub. No.: WO2010/111853
PCT Pub. Date: Oct. 7, 2010

(65) Prior Publication Data
US 2012/0020275 A1     Jan. 26, 2012

(30) Foreign Application Priority Data

Apr. 1, 2009   (CN) .......................... 2009 1 0081061

(51) Int. Cl.
| | |
|---|---|
| H04L 12/26 | (2006.01) |
| H04L 12/28 | (2006.01) |
| H04W 4/00 | (2009.01) |
| H04H 20/71 | (2008.01) |

(52) U.S. Cl.
USPC ...... 370/252; 370/395.42; 370/312; 370/390; 370/432; 370/328; 455/69; 714/748

(58) Field of Classification Search
USPC ......... 370/252, 312, 432, 390, 392, 328, 329, 370/338
See application file for complete search history.

(56) References Cited

U.S. PATENT DOCUMENTS

| | | | |
|---|---|---|---|
| 6,587,471 B1 * | 7/2003 | Bass et al. ..................... 370/432 |
| 7,194,000 B2 * | 3/2007 | Balachandran et al. . 370/395.42 |
| 7,813,324 B1 * | 10/2010 | Goel et al. .................... 370/336 |
| 7,864,722 B2 * | 1/2011 | Yi et al. ........................ 370/312 |
| 7,996,545 B2 * | 8/2011 | Vogl et al. ..................... 709/229 |
| 8,036,125 B2 * | 10/2011 | Pozhenko et al. ............ 370/235 |

(Continued)

FOREIGN PATENT DOCUMENTS

| | | |
|---|---|---|
| CN | 1794837 A | 6/2006 |
| CN | 1852495 A | 10/2006 |

(Continued)

*Primary Examiner* — Candal Elpenord
(74) *Attorney, Agent, or Firm* — Christopher L. Parmelee; Walker & Jocke

(57) ABSTRACT

The present invention discloses a method and an apparatus for data retransmission in an enhanced multimedia broadcast and multicast service; and the method includes: dividing all user terminals into different user groups according to service priorities of the user terminals, and setting retransmission parameters for the different user groups; and in a particular time period, if the number of times of data retransmission requests received from user terminals in one user group by a base station is not less than a preset value of the set retransmission parameter, performing data retransmission for the user terminals in the user group and retiming; otherwise, when the particular time period expires, performing the data retransmission for the user terminals in the user group and retiming. The present invention improves the data retransmission efficiency of the enhanced multimedia broadcast and multicast service on the premise of ensuring a certain level of impartiality.

12 Claims, 2 Drawing Sheets

(56) References Cited

U.S. PATENT DOCUMENTS

| | | | |
|---|---|---|---|
| 8,068,491 B2 * | 11/2011 | Chen et al. | 370/390 |
| 8,190,098 B2 * | 5/2012 | Hus et al. | 455/69 |
| 2008/0137656 A1 * | 6/2008 | Shin | 370/390 |
| 2008/0151805 A1 * | 6/2008 | Vayanos et al. | 370/312 |
| 2008/0192661 A1 * | 8/2008 | Hamamoto et al. | 370/310 |
| 2008/0205275 A1 * | 8/2008 | Rinne et al. | 370/235 |
| 2009/0116417 A1 | 5/2009 | Hu | |
| 2010/0110960 A1 | 5/2010 | Kim et al. | |

FOREIGN PATENT DOCUMENTS

| | | |
|---|---|---|
| CN | 1859069 A | 11/2006 |
| CN | 101001405 A | 7/2007 |
| CN | 101388755 A | 3/2009 |
| WO | 2008115023 A1 | 9/2008 |

* cited by examiner

METHOD AND APPARATUS FOR DATA RETRANSMISSION IN AN ENHANCED MULTIMEDIA BROADCAST AND MULTICAST SERVICE

FIELD OF THE INVENTION

The present invention relates to data transmission technology in wireless communication, and in particular to a method and an apparatus for data retransmission in an enhanced multimedia broadcast and multicast service.

BACKGROUND OF THE INVENTION

In the next generation of broadband wireless communication networks, newly released mobile multimedia services and traditional broadcast services, for example, sport information services for transmitting video clips of game highlights by broadcast or TV, services for intercepting content of programs from an existing TV channel by a mobile phone user, etc., require to occupy more and more frequency spectrums. The frequency spectrums are limited and expensive resources. In a mobile network, in particular in a mobile link, when a large number of receivers of a same server use a same link, a bottleneck phenomenon easily arises. Therefore, an Enhanced Multimedia Broadcast and Multicast Service (E-MBMS for short) is provided for solving the above problem.

When services such as interaction with a user terminal and data downloads exist in the E-MBMS, data retransmission of data or signaling may be involved. In the prior art, for all the user terminals, the number of times of the data retransmission and the number of processes of Hybrid Automatic Repeat Request (HARQ for short) are the same. Such a mode of the data retransmission will increase a round-trip delay of control signalings in a system, therefore, waiting time of the user terminals is increased and efficiency of the data retransmission is affected. Therefore, how to reduce the waiting time of the user terminals and to improve the efficiency of the data retransmission are problems to be urgently solved for a wireless communication system with an E-MBMS service.

SUMMARY OF THE INVENTION

In view of the above, the main object of the present invention is to provide a method and an apparatus for data retransmission in an enhanced multimedia broadcast and multicast service so as to reduce waiting time of user terminals and improve efficiency of the data retransmission.

According to one aspect of the present invention a method for data retransmission in an enhanced multimedia broadcast and multicast service is provided.

The method for data retransmission in the enhanced multimedia broadcast and multicast service according to the present invention comprises:

dividing all user terminals into different user groups according to service priorities of the user terminals, and setting retransmission parameters for the different user groups; and in a particular time period, if the number of times of data retransmission requests received from user terminals in one user group by a base station is not less than a preset value of the set retransmission parameter, performing data retransmission for the user terminals in the user group and retiming; otherwise, when the particular time period expires, performing the data retransmission for the user terminals in the user group and retiming.

Preferably, the retransmission parameters comprise: a data retransmission triggering period, a burst-mode data retransmission triggering threshold, and a data retransmission policy, wherein the particular time period is the data retransmission triggering period; and the preset value is the burst-mode data retransmission triggering threshold.

Preferably, the step of the base station performing the data retransmission for the user terminals in the user group comprises:

generating a data retransmission setting field; and sending the data retransmission setting field and retransmitted data to a user terminal requesting the data retransmission.

Preferably, the data retransmission setting field comprises: a service priority type subfield and a data retransmission policy specifying subfield.

Preferably, after the base station sends the data retransmission setting field and the retransmitted data to the user terminal requesting the data retransmission, the user terminals in the user group receive the retransmitted data according to the data retransmission setting field.

According to another aspect of the present invention, an apparatus for data retransmission in an enhanced multimedia broadcast and multicast service is provided.

The apparatus for data retransmission in the enhanced multimedia broadcast and service comprises a retransmission parameter setting unit, a timing unit, a counting unit, and a data retransmission processing unit, wherein the retransmission parameter setting unit is configured to divide all user terminals into different user groups according to service priorities of the user terminals, and to set retransmission parameters for the different user groups;

the timing unit is configured for timing according to the parameters set by the retransmission parameter setting unit, and to notify the data retransmission processing unit to perform data retransmission for the user groups when the timed time satisfies conditions of the parameters;

the counting unit is configured to record, after receiving a data retransmission request from a user terminal, the number of times of the data retransmission requests from a user group to which the user terminal belongs, and to notify the data retransmission processing unit to perform data retransmission for the user group when the timed time does not satisfy the conditions of the parameters and the number of times of the data retransmission requests from user terminals in the user group is not less than a preset value; and the data retransmission processing unit is configured to perform the data retransmission for the user terminals in the user group according to the parameters set by the retransmission parameter setting unit and notifications received from the timing unit and the counting unit, and to notify the timing unit to perform re-timing after the data retransmission.

Preferably, the retransmission parameters set by the retransmission parameter setting unit comprise a data retransmission triggering period, a burst-mode data retransmission triggering threshold, and a data retransmission policy, wherein the timing unit triggers the timing periodically according to the data retransmission triggering period; and the counting unit notifies the data retransmission processing unit when the time timed by the timing unit has not expired and the number of times of the data retransmission requests from the user terminals in the user group exceeds the burst-mode data retransmission triggering threshold.

Preferably, the data retransmission processing unit specifically comprises: a data retransmission setting field generating unit and a sending unit, wherein the data retransmission setting field generating unit is configured to generate a data retransmission setting field; and the sending unit is configured to send the data retransmission setting field and retransmitted data to the user terminal requesting the data retransmission, and to notify the timing unit to perform retiming after the data retransmission is performed.

Preferably, the data retransmission setting field generated by the data retransmission setting field generating unit comprises: a service priority type subfield and a data retransmission policy specifying subfield.

Preferably, the user terminals are used to receive the retransmitted data according to the data retransmission setting field and the retransmitted data sent by the sending unit.

In the method and the apparatus for data retransmission in the enhanced multimedia broadcast and multicast service provided by the present invention, the user terminals are divided into different user groups according to the service priorities, and different data retransmission policies are used for different user groups, thereby decreasing the round-trip delay of the control signaling in the system as much as possible to further reduce the waiting time of the user terminal.

At the same time, the data retransmission triggering periods and the burst-mode data retransmission triggering thresholds are set for different user groups, so as to trigger periodically or burstingly the data retransmission of the user groups and to improve the efficiency of the data retransmission of the enhanced multimedia broadcast and multicast service on the premise of ensuring a certain level of impartiality.

DETAILED DESCRIPTION OF THE PREFERRED EMBODIMENTS

Function Overview

In consideration of the problem in the related art that using a same number of processes for all the user terminals when performing data retransmission increases the round-trip delay of control signalings in a system, thereby increasing the waiting time of the user terminals and affecting the data retransmission efficiency, the present invention provides a solution for data retransmission in an enhanced multimedia broadcast and multicast service. The basic idea of the solution is: dividing user terminals into different user groups according to service priorities and setting retransmission parameters for the different user groups, so as to trigger periodically or burstingly the data retransmission of the user groups and to retransmit data to the user terminals in the user groups according to set data retransmission policies.

In the above, the retransmission parameters include: a data retransmission triggering period, a burst-mode data retransmission triggering threshold, and a data retransmission policy. In addition, it should be noted that signaling retransmission is also included in the data retransmission in the present invention.

The present invention will be described hereinafter in details with reference to the figures and in combination with the embodiments. What needs to be explained is that, the embodiments of the present application and the features of the embodiments can be combined with each other if there is no conflict.

Method Embodiment

Figure 1:
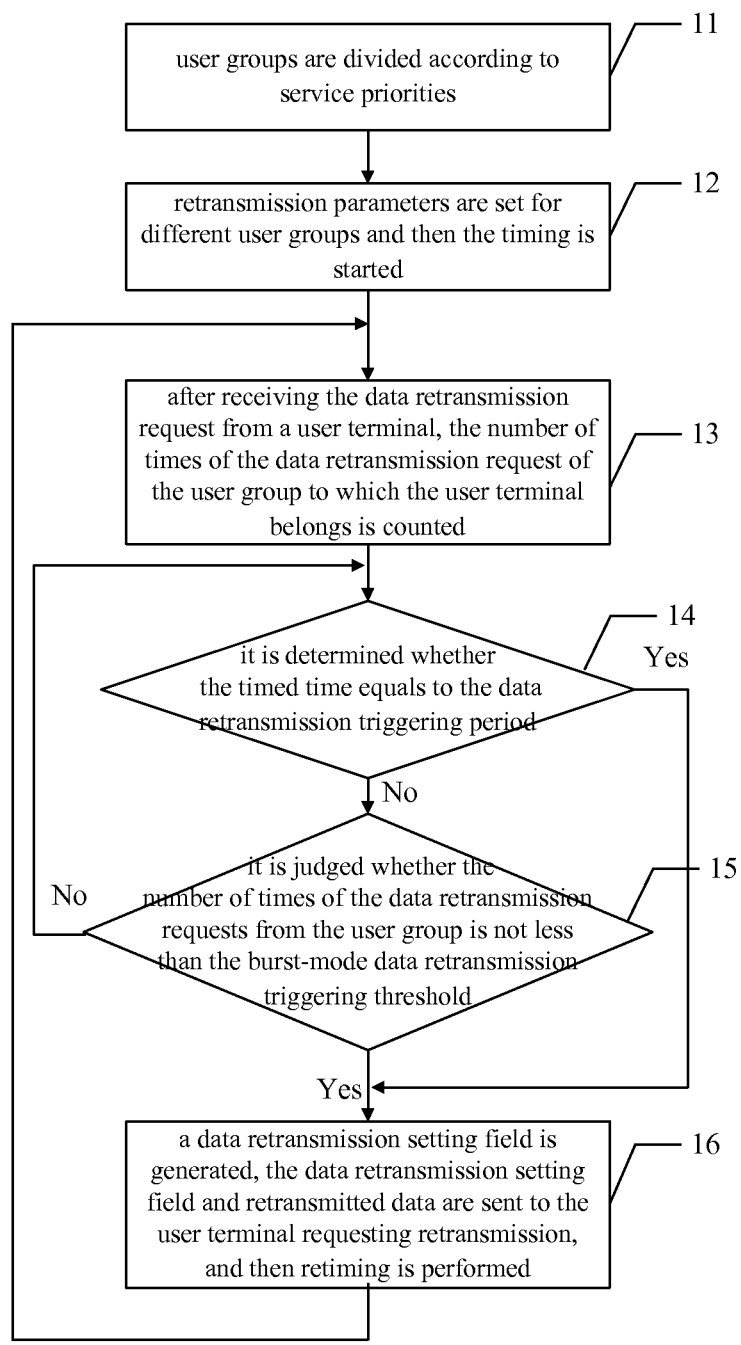
FIG. 1 is a flow chart of a method for data retransmission in an enhanced multimedia broadcast and multicast service according to the embodiments of the present invention.

FIG. 1 is a flow chart of a method for data retransmission in an enhanced multimedia broadcast and multicast service according to the embodiments of the present invention. As shown in FIG. 1, the method for data retransmission in the enhanced multimedia broadcast and multicast service according to the embodiments of the present invention includes the following Step 11 to Step 16.

Step 11: user groups are divided according to service priorities.

Here, different priorities corresponding to services, i.e., service priorities, are set according to system needs. For example, all the services are distinguished according to the priorities from the lowest to the highest as: unsolicited grant services, real-time polling services, extended real-time polling services, non-real-time polling services, and best-effort services. Correspondingly, all the user terminals are divided into an unsolicited grant service user group, a real-time polling service user group, an extended real-time polling service user group, a non-real-time polling service user group, and a best-effort service user group.

Dividing all the user terminals into the different user groups according to the service priorities of the user terminals aims to distinguish the user terminals according to the service priorities, so as to only process all the user terminals in a certain user group when processing a request for data retransmission, the user terminals in other user groups, however, waiting in this time period.

Step 12: retransmission parameters are set for different user groups, and then the timing is started.

The retransmission parameters generally comprise: a data retransmission triggering period, a burst-mode data retransmission triggering threshold and a data retransmission policy. Here, the retransmission parameters are set for the different user groups, the respective retransmission parameters of the respective user groups may be either different or identical.

In the above, the data retransmission triggering period is used to determine whether to process the data retransmission requests of the user terminals in a user group according to the time.

The burst-mode data retransmission triggering threshold is used to determine, according to the number of times of the data retransmission requests of a user group during a data retransmission triggering period, whether to process the data retransmission request of the user terminal in the user group.

The data retransmission policy is used to restrict the use of resources when processing the data retransmission, the purpose of which is to use different data retransmission manners for the data retransmission corresponding to different user groups, so as to reduce signaling interaction and a round-trip time delay. For example, as for the best-effort service user group, during the data retransmission, it needs to be ensured to the best that all the user terminals in the user group can receive retransmitted data correctly in order to guarantee its service quality; thus more times of the data retransmission or more processes of hybrid automatic data retransmission request are needed, e.g., the number of times of the data retransmission needed is five times. While for the unsolicited grant service user group, the number of times of the data retransmission or the number of processes of the hybrid automatic data retransmission request needed is less, e.g., the number of times of the data retransmission needed is one time. Of course, the data retransmission policy may also include other contents associated with the data retransmission and should not be limited to the contents specified by the present article.

Step 13: after receiving a data retransmission request from a user terminal, the base station counts the number of times of the data retransmission requests from a user group to which the user terminal belongs.

Step 14: it is determined whether the timed time equals to the data retransmission triggering period of the user group, wherein if it does, Step 16 is executed; otherwise, Step 15 is executed.

This step can be interpreted as that: if the base station has maintained a state of not performing data retransmission processing for a certain user group for a certain time period, i.e., the data retransmission triggering period of the user group, the data retransmission processing is performed regardless of the number of times of the data retransmission requests received from the user terminals in the user group.

During this period, the base station needs to keep all the data for use when the data retransmission is triggered.

Step 15: it is judged whether the number of times of the data retransmission requests from the user group is no less than the burst-mode data retransmission triggering threshold of the user group, wherein if it is, Step 16 is executed; otherwise, Step 14 is returned thereto.

The present step may be interpreted as that: when the data retransmission triggering period has not expired, if the number of times of the data retransmission requests received from the user terminals in the user group exceeds a certain value, i.e., the burst-mode data retransmission triggering threshold of the user group, the data retransmission processing is performed burstingly.

Step 16: the base station generates a data retransmission setting field, sends the data retransmission setting field and the retransmitted data to the user terminal requesting the retransmission, then performs re-timing for the user group, and Step 13 is returned thereto.

Figure 2:
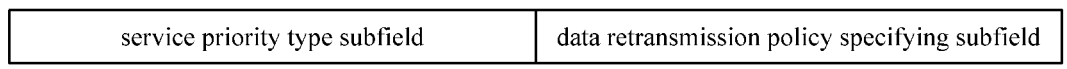
FIG. 2 is a schematic diagram of a structure of a data retransmission setting field according to the embodiments of the present invention.

FIG. 2 is a structural schematic diagram of the data retransmission setting field according to the embodiments of the present invention. As shown in FIG. 2, the data retransmission setting field generally includes: a service priority type subfield and a data retransmission policy specifying subfield, wherein the function of the service priority type subfield is to instruct a user group matching the service priority type subfield, such that all the user terminals in the user group receive the retransmitted data according to the contents specified by the data retransmission policy, while no processing is performed for the user terminals of the user groups matching other service priority types. The function of the data retransmission policy specifying subfield is to start retransmitting data according to a predetermined data retransmission policy negotiated by the base station and the user terminal.

After the base station sends the data retransmission setting field and the retransmitted data to the user terminal requesting the retransmission, the user terminal receives the data retransmission setting field and receives the retransmitted data according to the data retransmission policy, i.e., the user terminals in the user group matching the service priority type subfield receive data, while other parts waiting during the data retransmission period.

A computer readable medium is also provided according to the embodiments of the present invention. Computer executable instructions are stored in the computer readable medium. When the instructions are executed by a computer or a processor, the computer or processor executes the processes of Step 11 to Step 16 as shown in FIG. 1; and preferably, one or more of the above method embodiments can be performed.

Apparatus Embodiments

Figure 3:
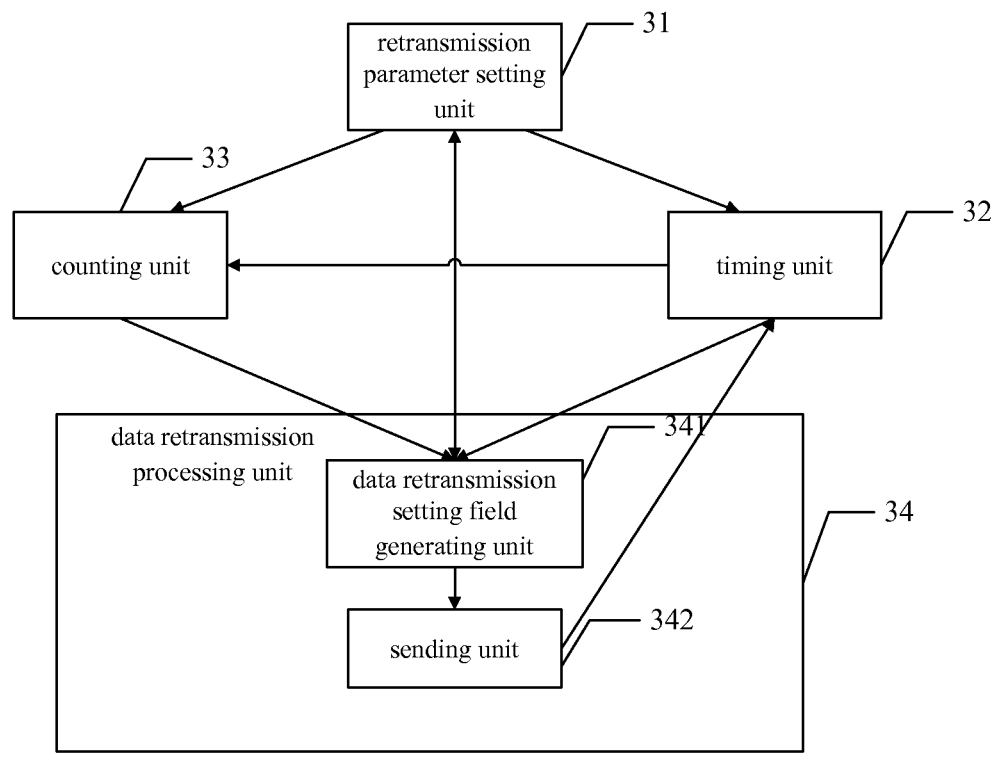
FIG. 3 is a structural diagram of an apparatus for data retransmission in an enhanced multimedia broadcast and multicast service according to the embodiments of the present invention.

FIG. 3 is a structural diagram of an apparatus for data retransmission in an enhanced multimedia broadcast and multicast service according to the embodiments of the present invention. As shown in FIG. 3, the apparatus for data retransmission in the enhanced multimedia broadcast and multicast service according to the embodiments of the present invention comprises: a retransmission parameter setting unit 31, a timing unit 32, a counting unit 33, and a data retransmission processing unit 34.

The retransmission parameter setting unit 31 is configured to divide all the user terminals into different user groups according to service priorities and to set retransmission parameters for the user groups.

Here, different priorities corresponding to services, i.e., service priorities, are set according to system needs. For example, all the services are distinguished according to the priorities from the lowest to the highest as: unsolicited grant services, real-time polling services, extended real-time polling services, non-real-time polling services, and best-effort services. Correspondingly, all the user terminals are divided into an unsolicited grant service user group, a real-time polling service user group, an extended real-time polling service user group, a non-real-time polling service user group, and a best-effort service user group.

Dividing all the user terminals into the different user groups according to the service priorities of the user terminals aims to distinguish the user terminals according to the service priorities, so as to only process all the user terminals in a certain user group when processing a request for data retransmission, the user terminals in other user groups, however, waiting in this time period.

In addition, the retransmission parameters set by the retransmission parameter setting unit 31 for the user groups generally include: a data retransmission triggering period, a burst-mode data retransmission triggering threshold and a data retransmission policy. Here, the retransmission parameters are set for different user groups, the respective retransmission parameters of the respective user groups may be either different or identical.

In the above, the data retransmission triggering period is used to determine whether to process a data retransmission request from a user terminal in a user group according to the time.

The burst-mode data retransmission triggering threshold is used to determine, according to the number of times of the data retransmission requests from a user group during a data retransmission triggering period, whether to process a data retransmission request from a user terminal.

The data retransmission policy is used to restrict the use of resources when processing the data retransmission, the purpose of which is to use different data retransmission manners for the data retransmission corresponding to different user groups, so as to reduce signaling interaction and a round-trip time delay. For example, as for the best-effort service user group, during the data retransmission, it needs to be ensured to the best that all user terminals in a user group can receive retransmitted data correctly in order to guarantee its service quality; thus, more times of the data retransmission or more processes of hybrid automatic data retransmission request are needed, e.g., the number of times of the data retransmission needed is five times, while for the unsolicited grant service user group, the number of times of the data retransmission or the number of processes of the hybrid automatic data retransmission request needed is less, e.g., the number of times of the data retransmission needed is one time. Of course, the data retransmission policy may also include other contents associated with the data retransmission and is not limited to the contents specified by the present article.

The timing unit 32 is configured to trigger the timing of a period according to the data retransmission and to notify the data retransmission processing unit 34 to perform data retransmission processing for a user group when the timing unit 32 of the user group expires.

The counting unit 33 is configured to record the number of times of the data retransmission requests from a user group to which a user terminal belongs after receiving a data retransmission request from the user terminal, and to notify the data retransmission processing unit 34 to perform data retransmission processing for the user group when the timing unit 32 has not expired and the number of times of the data retransmission requests from user terminals in the user group is not less than the burst-mode data retransmission triggering threshold.

The data retransmission processing unit 34 comprises a data retransmission setting field generating unit 341 and a transmitting unit 342, wherein the data retransmission setting field generating unit 341 is configured to generate a data retransmission setting field according to the parameters set by the retransmission parameter setting unit 31 and the received notifications of the timing unit 32 and the counting unit 34; and the sending unit 342 is configured to send the data retransmission setting field and the retransmitted data to a user terminal requesting data retransmission and to notify the timing unit 32 to perform re-timing after accomplishing the sending.

Herein, the data retransmission setting field generally includes: a service priority type subfield and a data retransmission policy specifying subfield, wherein the function of the service priority type subfield is to instruct a user group matching the service priority type subfield, such that all user terminals in the user group receive the retransmitted data according to the contents specified by the data retransmission policy, while no processing is performed for the user terminals of the user groups matching other service priority types. The function of the data retransmission policy specifying subfield is to start retransmitting data according to a predetermined data retransmission policy agreed by the base station and the user terminal.

The user terminals are configured to receive the retransmitted data according to the data retransmission setting field and the retransmitted data sent by the sending unit 342, while other parts wait in the data retransmission period.

By the above solutions provided by the embodiments of the present invention, data retransmission efficiency of the enhanced multimedia broadcast and multicast service is improved on the premise of ensuring a certain degree of impartiality.

In addition, the realization of the present invention does not modify the systematic architecture and the current processing procedure, so the present invention is easy to be realized, facilitates popularization in the technical field, and has remarkable industrial applicability.

Obviously, those skilled in the art shall understand that individual modules or individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit module respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for data retransmission in an enhanced multimedia broadcast and multicast service, the method comprising: dividing all user terminals into different user groups according to service priorities of the user terminals, and setting retransmission parameters for each of the different user groups; and in a particular time period, if the number of times of data retransmission requests received from the user terminals in one of the different user groups by a base station is not less than a preset value of the set retransmission parameter parameters, performing data retransmission for the user terminals in the user group and retiming; otherwise, when the particular time period expires, performing the data retransmission for the user terminals in the user group and retiming, wherein the retransmission parameters comprise: a data retransmission triggering period, a burst-mode data retransmission triggering threshold, and a data retransmission policy, wherein the particular time period is the data retransmission triggering period; and the preset value is the burst-mode data retransmission triggering threshold.

2. The method for data retransmission according to claim 1, wherein the step of the base station performing the data retransmission for the user terminals in the user group comprises:
   generating a data retransmission setting field; and
   sending the data retransmission setting field and retransmitted data to a user terminal requesting the data retransmission.

3. The method for data retransmission according to claim 2, wherein the data retransmission setting field comprises: a service priority type subfield and a data retransmission policy specifying subfield.

4. The method for data retransmission according to claim 2, wherein after the base station sends the data retransmission setting field and the retransmitted data to the user terminal requesting the data retransmission, the user terminals in the user group receive the retransmitted data according to the data retransmission setting field.

5. An apparatus for data retransmission in an enhanced multimedia broadcast and multicast service, the apparatus for data retransmission comprising a retransmission parameter setting unit, a timing unit, a counting unit, a data retransmission processing unit and a processor, wherein
   the retransmission parameter setting unit is configured to divide all user terminals into different user groups according to service priorities of the user terminals, and to set retransmission parameters for each of the different user groups;
   the timing unit is configured for timing according to the parameters set by the retransmission parameter setting unit, and to notify the data retransmission processing unit to perform data retransmission for the user groups when the timed time satisfies conditions of the parameters;

the counting unit is configured to record, after receiving a data retransmission request from a user terminal, the number of times of the data retransmission requests from a user group to which the user terminal belongs, and to notify the data retransmission processing unit to perform data retransmission for the user group when the timed time does not satisfy the conditions of the parameters and the number of times of the data retransmission requests from user terminals in the user group is not less than a preset value;

the data retransmission processing unit is configured to perform the data retransmission for the user terminals in the user group according to the parameters set by the retransmission parameter setting unit and notifications received from the timing unit and the counting unit, and to notify the timing unit to perform re-timing after the data retransmission; and the processor is configured to execute the retransmission parameter setting unit, the timing unit, the counting unit, and the data retransmission processing unit.

6. The apparatus for data retransmission according to claim 5, wherein the retransmission parameters set by the retransmission parameter setting unit comprise a data retransmission triggering period, a burst-mode data retransmission triggering threshold, and a data retransmission policy, wherein the timing unit triggers the timing periodically according to the data retransmission triggering period; and the counting unit notifies the data retransmission processing unit when the time timed by the timing unit has not expired and the number of times of the data retransmission requests from the user terminals in the user group exceeds the burst-mode data retransmission triggering threshold.

7. The apparatus for data retransmission according to claim 5, wherein the data retransmission processing unit specifically comprises: a data retransmission setting field generating unit and a sending unit, wherein the data retransmission setting field generating unit is configured to generate a data retransmission setting field; and the sending unit is configured to send the data retransmission setting field and retransmitted data to the user terminal requesting the data retransmission, and to notify the timing unit to perform retiming after the data retransmission is performed.

8. The apparatus for data retransmission according to claim 7, wherein the data retransmission setting field generated by the data retransmission setting field generating unit comprises: a service priority type subfield and a data retransmission policy specifying subfield.

9. The apparatus for data retransmission according to claim 7, wherein the user terminals are used to receive the retransmitted data according to the data retransmission setting field and the retransmitted data sent by the sending unit.

10. The apparatus for data retransmission according to claim 6, wherein the data retransmission processing unit specifically comprises: a data retransmission setting field generating unit and a sending unit, wherein the data retransmission setting field generating unit is configured to generate a data retransmission setting field; and the sending unit is configured to send the data retransmission setting field and retransmitted data to the user terminal requesting the data retransmission, and to notify the timing unit to perform retiming after the data retransmission is performed.

11. The apparatus for data retransmission according to claim 10, wherein the data retransmission setting field generated by the data retransmission setting field generating unit comprises: a service priority type subfield and a data retransmission policy specifying subfield.

12. The apparatus for data retransmission according to claim 10, wherein the user terminals are used to receive the retransmitted data according to the data retransmission setting field and the retransmitted data sent by the sending unit.

* * * * *